(12) United States Patent
Tsujii et al.

(10) Patent No.: US 6,809,502 B2
(45) Date of Patent: Oct. 26, 2004

(54) STORAGE BATTERY CONTROL APPARATUS AND CONTROL METHOD THEREOF

(75) Inventors: Hiroshi Tsujii, Mishima (JP); Hideto Hanada, Yokohama (JP); Ken Kuretake, Mishima (JP); Masanori Sugiura, Toyota (JP); Takashi Kawai, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 31 days.

(21) Appl. No.: 10/419,099

(22) Filed: Apr. 21, 2003

(65) Prior Publication Data

US 2003/0210017 A1 Nov. 13, 2003

(30) Foreign Application Priority Data

May 10, 2002 (JP) ........................................ 2002-136049

(51) Int. Cl.$^7$ ........................ H01M 10/44; H01M 10/46
(52) U.S. Cl. ........................................ 320/150; 320/166
(58) Field of Search ................................ 320/127, 128, 320/132, 150, 153, 154, 166

(56) References Cited

U.S. PATENT DOCUMENTS

| | | | | |
|---|---|---|---|---|
| 5,635,812 A | * | 6/1997 | Eschbach et al. | 422/90 |
| 6,242,887 B1 | * | 6/2001 | Burke | 320/104 |
| 6,297,618 B2 | * | 10/2001 | Emori et al. | 320/132 |

FOREIGN PATENT DOCUMENTS

JP     A 2000-23306     1/2000

\* cited by examiner

*Primary Examiner*—Edward H. Tso
(74) *Attorney, Agent, or Firm*—Oliff & Berridge, PLC

(57) ABSTRACT

In order to provide a storage battery control apparatus capable of increasing the amount of charges stored in a storage battery, an aspect of the storage battery control apparatus of the invention is a storage battery control apparatus having: a first controller that releases charges stored in a capacitor that forms a storage battery if an inter-terminal voltage of the capacitor becomes equal to or higher than a predetermined threshold; a temperature detector that detects a temperature of the capacitor; and a second controller that changes the predetermined threshold in accordance with the temperature of the capacitor.

14 Claims, 3 Drawing Sheets

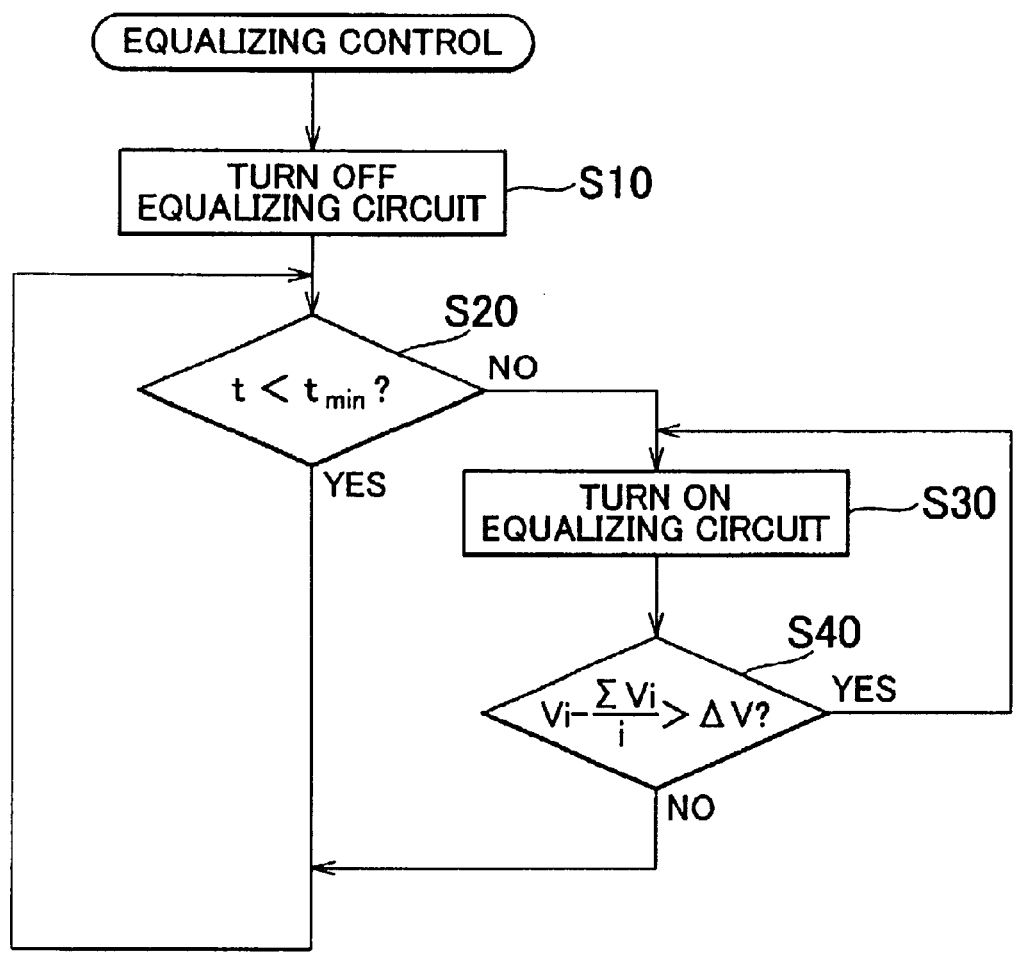

STORAGE BATTERY CONTROL APPARATUS AND CONTROL METHOD THEREOF

INCORPORATION BY REFERENCE

The disclosure of Japanese Patent Application No. 2002-136049 filed on May 10, 2002 including the specification, drawings and abstract is incorporated herein by reference in its entirety.

BACKGROUND OF THE INVENTION

1. Field of the Invention

The invention relates to a storage battery control apparatus and control method.

2. Description of the Related Art

A related-art storage battery control apparatus is described in Japanese Patent Application Laid-Open Publication No. 2000-23306. An electric power supply system for an electric vehicle, as a storage battery control apparatus described in this laid-open patent application, is designed for installation in an electric vehicle in which a vehicle-driving electric motor is driven by electric power from a main electricity storage or an engine generator. The main electricity storage is formed by a capacitor battery that has a plurality of series-connected electric double-layer capacitor cells. This system also has an auxiliary electricity storage for accessories.

If the voltage of any one of the capacitor cells reaches a set value, or if the charging operation time reaches a set value, or if the number of charge-discharge cycles reaches a set value, the power supply system charges the other capacitor cells using power from the auxiliary electricity storage, regenerative braking power, or power from the generator until the voltages of the other capacitor cells reach the set value. Thus, the system substantially equalizes voltages of all capacitor cells.

However, the related-art storage battery control apparatus releases stored charges if the voltage between the capacitor terminals reaches a set value. Therefore, if the capacitor internal resistance rises due to a temperature fall, the control apparatus performs discharge when some more charges can be stored into the capacitors. Such a discharge operation is not economical. In view of the above-described situations, it is an object of the invention to provide a storage battery control apparatus capable of increasing the amount of charges stored into a storage battery.

SUMMARY OF THE INVENTION

One aspect of the storage battery control apparatus of the invention is characterized by including: a first controller that releases charges stored in a capacitor that forms a storage battery if an inter-terminal voltage of the capacitor becomes equal to or higher than a predetermined threshold; a temperature detector that detects a temperature of the capacitor; and a second controller that changes the predetermined threshold in accordance with the temperature of the capacitor.

Therefore, if the inter-terminal voltage of the capacitor changes due to a change in temperature, unnecessary discharge is substantially avoided by changing the threshold. Hence, the amount of charges stored in the storage battery can be increased.

The second controller may increase the predetermined threshold as the temperature of the capacitor decreases. If the temperature of the capacitor becomes low, the capacitor internal resistance increases, and therefore, an increased amount of charges can be stored in the capacitor by raising the threshold.

The first controller may discharge the capacitor if the inter-terminal voltage of the capacitor reaches the predetermined threshold. Therefore, if the inter-terminal voltage of the capacitor reaches the predetermined threshold, the capacitor can be protected by discharging the capacitor.

Furthermore, it is also possible that the first controller does not discharge the capacitor until the inter-terminal voltage of the capacitor reaches the predetermined threshold. Therefore, a sufficient amount of charges can be stored in the capacitor by avoiding release of charges stored in the capacitor.

Still further, the storage battery may have a plurality of capacitors connected in series, and the first controller may perform discharge until amounts of charges stored in all the capacitors become substantially equal. Greater amounts of charges can be stored if the differences among the amounts of charges stored in the capacitors are less or nil. Therefore, if a plurality of capacitors are connected in series, the above-described construction allows storage of a greater amount of charges.

Still further, if the inter-terminal voltage of any one of the capacitors reaches the predetermined threshold, the first controller may release charges stored in the capacitor whose inter-terminal voltage has reached the predetermined threshold, on a basis of comparison with a value based on the amounts of charges stored in all the capacitors. Therefore, by performing discharge on the basis of comparison with a value based on the inter-terminal voltages of all the capacitors, the amounts of charges stored in the capacitors can be equalized. It is to be noted herein that the capacitor inter-terminal voltage is dependent on the amount of charges stored.

The storage battery control apparatus may further r include: a voltage detector that detects the inter-terminal voltage of the capacitor; a switch that allows a change of a state of connection between terminals of the capacitor; and a control circuit that is connected to the voltage detector, the temperature detector and the switch, and that turns the switch on and off so that discharge of the capacitor is controlled.

Therefore, the capacitor inter-terminal voltage can be detected by the voltage detector. Discharge can be performed by the control circuit turning on the switch on the basis of the measured value of the inter-terminal voltage and the temperature of the capacitor. Discharge can be prohibited by turning off the switch.

Another aspect of the storage battery control apparatus of the invention is characterized by including: a first controller that releases charges stored in a capacitor that forms a storage battery if an inter-terminal voltage of the capacitor becomes equal to or higher than a predetermined threshold; a temperature detector that detects a temperature of the capacitor; and a second controller that avoids setting the predetermined threshold if the temperature of the capacitor is lower than a predetermined temperature.

If the temperature becomes low, the capacitor internal resistance increases and therefore the allowable amount of charges stored decreases, so that the need for discharge reduces. Therefore, avoidance of the setting the threshold will considerably avoid unnecessary discharge, and will increase the allowable amount of charges stored, and will protect the capacitor, and will increase the total amount of charges stored.

An aspect of the control method of the storage battery control apparatus of the invention is characterized by including the steps of: releasing charges stored in a capacitor that forms a storage battery if an inter-terminal voltage of the capacitor becomes equal to or higher than a predetermined threshold; detecting a temperature of the capacitor; and changing the predetermined threshold in accordance with the temperature of the capacitor.

Another aspect of the control method of the storage battery control apparatus of the invention is characterized by including the steps of: releasing charges stored in a capacitor that forms a storage battery if an inter-terminal voltage of the capacitor becomes equal to or higher than a predetermined threshold; detecting a temperature of the capacitor; and avoiding setting the predetermined threshold if the temperature of the capacitor is low.

BRIEF DESCRIPTION OF THE DRAWINGS

FIG. 3 is a flowchart illustrating an equalizing control of the controller 3 that performs a function as an equalizing circuit.

DETAILED DESCRIPTION OF THE PREFERRED EMBODIMENTS

Figure 1:
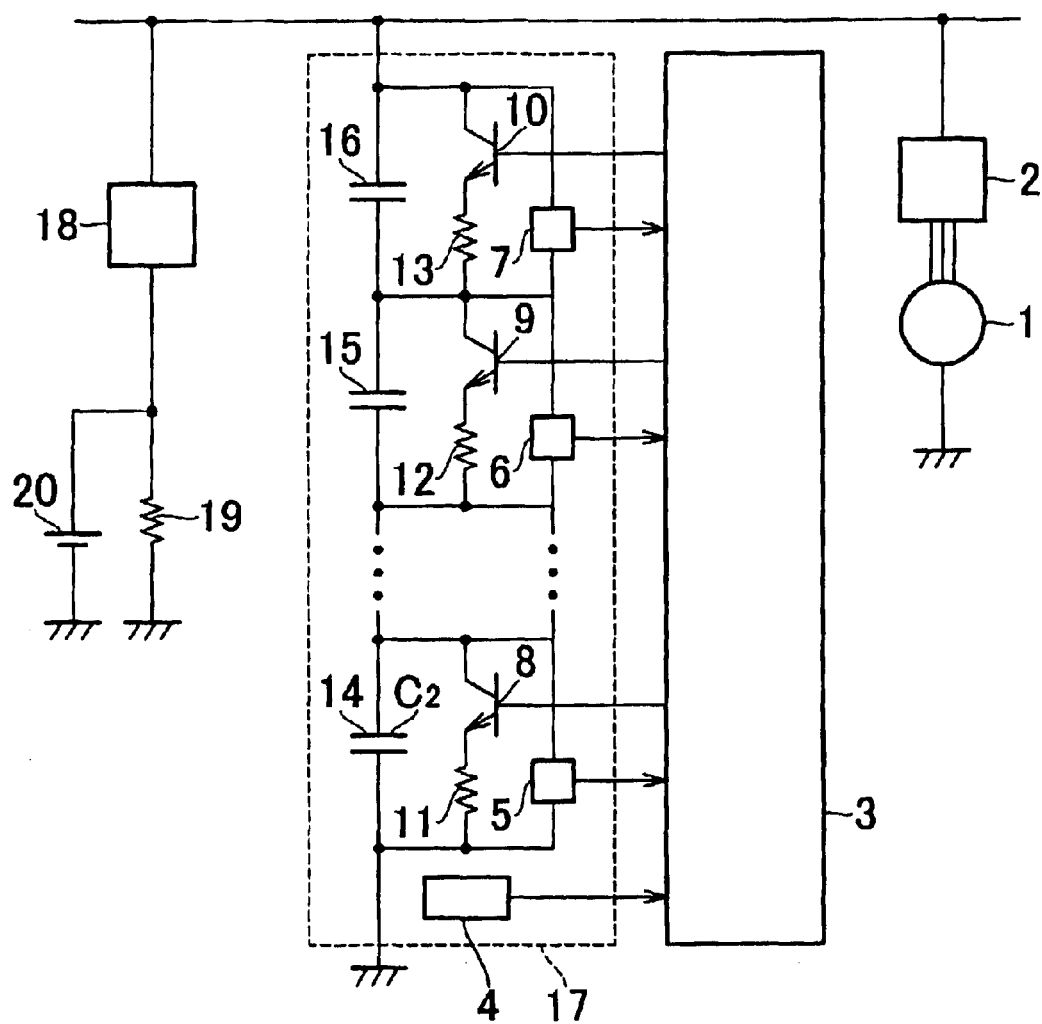
FIG. 1 is a block diagram of a storage battery control apparatus.

Storage battery control apparatuses in accordance with preferred embodiments of the invention will be described hereinafter with reference to the accompanying drawings. Like components and elements are represented by like reference characters in the drawings, and will not be repeatedly described below.

FIG. 1 is a block diagram of a storage battery control apparatus. This storage battery control apparatus is to be installed in a vehicle. Electric power generated by a generator 1 is stored into a battery 20 via a rectifier circuit 2 and a DC/DC converter 18. Charges stored in the battery 20 flow into a load 19, such as a headlight, a self-starting motor, etc., when an appropriate switch is turned on.

The battery 20 is electrically connected to a storage battery 17 so that the charges stored in the battery 20 and the charges from the generator 1 can be stored into the storage battery 17. The storage battery 17 has a group of capacitors (capacitor cells) 14, 15, 16, such as electric double-layer capacitors or the like. The capacitors 14, 15, 16 are connected in series, and are individually capable of storing charges. Charges stored in the storage battery 17 are supplied to the load 19 when necessary.

The inter-terminal voltage of each capacitor 14, 15, 16 is detected by a cell voltage detector circuit 5, 6, 7 connected to the terminals of each capacitor. The terminals of each capacitor 14, 15, 16 are interconnected via a connecting switch 8, 9, 10 and a resistor 11, 12, 13. When a connecting switch 8, 9, 10 is turned on, the corresponding capacitor 14, 15, 16 releases charges. In this embodiment, the connecting switches 8, 9, 10 are transistors, and control signals from a controller are input to a base (or a gate) of each transistor.

The capacitor inter-terminal voltages $V_{14}$, $V_{15}$, $V_{16}$ detected by the cell voltage detector circuits 5, 6, 7 are input to a controller 3. The temperature of the capacitors 14, 15, 16 is detected by a temperature sensor 4 provided near the capacitor group. The capacitor temperature t detected by the temperature sensor 4 is also input to the controller 3. The controller 3 is able to control the release of capacitor-stored charges by controlling the connecting switches 8, 9, 10.

In this embodiment, the controller 3 functions as follows. The controller 3 releases charges from each one of the capacitors 14, 15, 16 of the storage battery 17 so that none of the inter-terminal voltages $V_{14}$, $V_{15}$, $V_{16}$ of the capacitors 14, 15, 16 reaches a predetermined threshold Vmax. Furthermore, the controller 3 changes the predetermined threshold Vmax so as to avoid unnecessary discharge in accordance with the capacitor temperature t. The discharge in this embodiment is accomplished by turning on the connecting switches 8, 9, 10, and the released power is consumed by the resistors 11, 12, 13.

According to this storage battery control apparatus, if the capacitor inter-terminal voltages $V_{14}$, $V_{15}$, $V_{16}$ change with temperature, the controller 3 changes the threshold Vmax to substantially avoid unnecessary discharge. Therefore, the amount of charges stored in the storage battery 17 can be increased.

However, if the temperature of the capacitors 14, 15, 16 is low, there is a rise in the capacitor inter-terminal voltage based on the capacitor internal resistance, and therefore there is a possibility that the capacitor inter-terminal voltages $V_{14}$, $V_{15}$, $V_{16}$ may reach the threshold Vmax at an earlier timing. The controller 3 performs the discharge control so that the threshold Vmax is not reached. Therefore, if the threshold Vmax is constant and the temperature of the capacitors 14, 15, 16 is low, unnecessary discharge is performed when storage of more charges into capacitors is still possible. Therefore, in a preferred control, if the temperature of the capacitors 14, 15, 16 is low, the controller 3 raises the threshold Vmax so as to increase the amount of charges stored into the storage battery 17.

That is, at low temperatures, the capacitors 14, 15, 16 are able to store amounts of charges greater than an allowable amount of stored charges derived from the capacitor inter-terminal voltage $V_{14}$, $V_{15}$, $V_{16}$, and therefore, a great amount of charges can be stored into the capacitors by the controller 3 changing the threshold Vmax.

The controller 3 performs the aforementioned discharge if the capacitor inter-terminal voltage $V_{14}$, $V_{15}$, $V_{16}$ reaches the threshold Vmax. That is, in a case where the capacitor inter-terminal voltage $V_{14}$, $V_{15}$, $V_{16}$ reaches the threshold Vmax, including a case where the threshold Vmax is exceeded, the capacitors 14, 15, 16 can be protected by discharge.

That is, the controller 3 avoids performing the discharge until the capacitor inter-terminal voltage $V_{14}$, $V_{15}$, $V_{16}$ reaches the threshold Vmax. Therefore, good amounts of charges can be stored due to the avoidance of release of charges stored in the capacitors 14, 15, 16.

The controller 3 also functions as an equalizing circuit. The storage battery 17 has the capacitors 14, 15, 16 connected in series. The controller 3 performs discharge of capacitors so that the amounts of charges stored in all the capacitors 14, 15, 16 are equalized. In the case where the capacitors 14, 15, 16 are connected in series, greater amounts of charges can be stored if the differences among the amounts of charges stored in the capacitors 14, 15, 16 are less or nil.

If the inter-terminal voltage of the capacitor 14 (defined as inter-terminal voltage $V_{14}$) reaches the threshold Vmax, the controller 3 performs control based on a value X that factors in the amounts of charges stored in the other capacitors 15, 16. The value X is a mean value of the inter-terminal voltages $V_{14}$, $V_{15}$, $V_{16}$ derived from the amounts of charges in the capacitors 14, 15, 16, or the inter-terminal voltage of a standard capacitor whose properties are controlled for the purpose of a reference.

On the basis of the comparison between the inter-terminal voltage $V_{14}$ reaching the predetermined threshold Vmax and the value X, the controller 3 releases charges from the capacitor 14. For example, the controller 3 performs discharge so that the error from the aforementioned mean value becomes less than or equal to a predetermined value. That is, due to the discharge based on the comparison with the value X, equalization of the amounts of charges can be accomplished.

Figure 2:
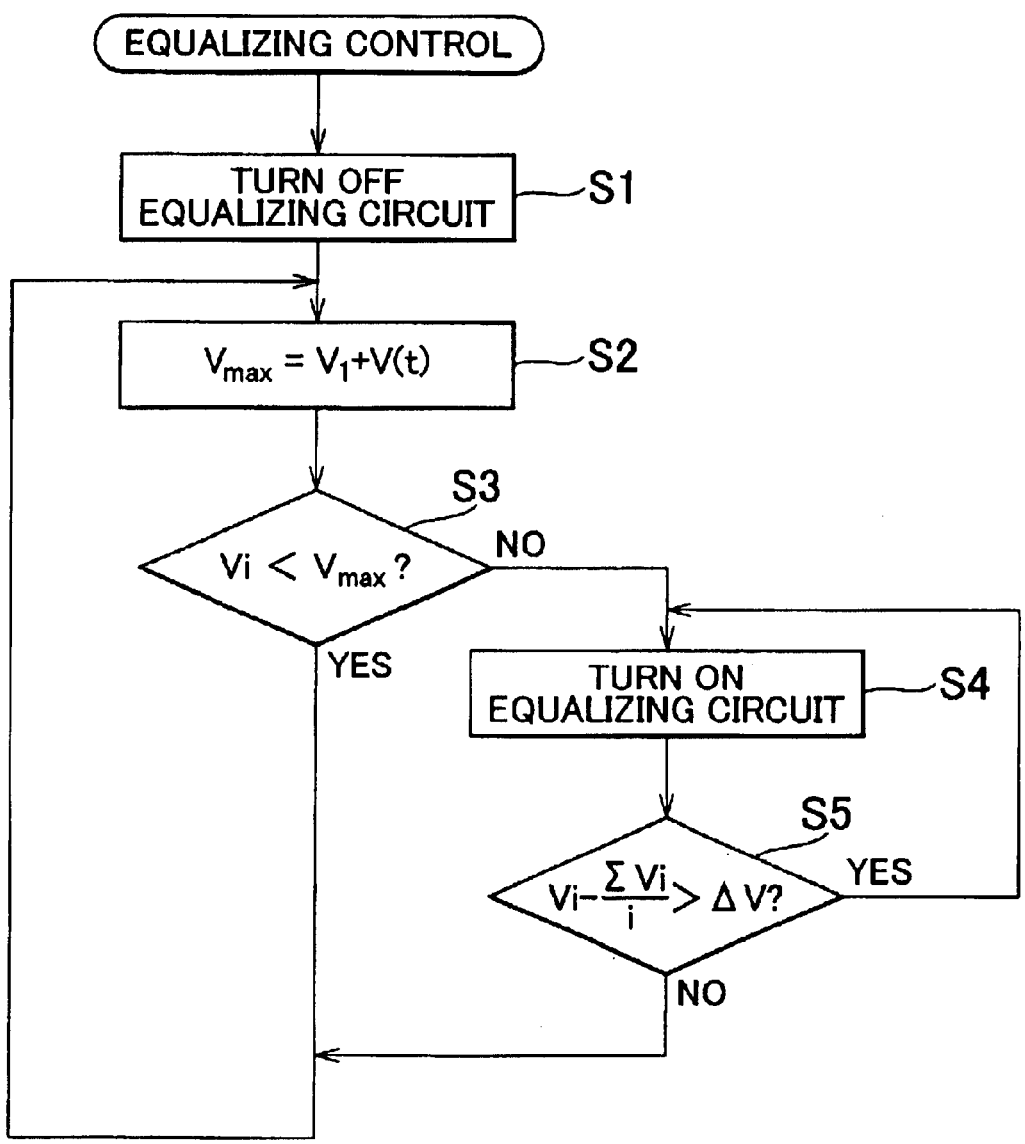
FIG. 2 is a flowchart illustrating an equalizing control of a controller 3 that performs a function as an equalizing circuit.

FIG. 2 is a flowchart illustrating an embodiment of the equalizing control performed by the controller 3 functioning as an equalizing circuit.

In an initial state, the equalizing circuit is off (S1). That is, the capacitor 14 concerned is not discharged. Next, a threshold Vmax is set (S2). The threshold Vmax is a value obtained by adding a temperature-dependent variation V(t) to an initial threshold (voltage) $V_1$. The variation V(t) increases as the temperature decreases.

The set threshold Vmax and the detected voltage Vi (=$V_{14}$) are compared (S3). If the detected voltage Vi is less than the threshold Vmax, the process returns to S2, without performing discharge. Conversely, if the voltage Vi is higher than or equal to the threshold Vmax, the equalizing circuit is turned on so as to start discharging the capacitor 14 that provides a voltage exceeding the threshold Vmax (S4). The discharge of the capacitor 14 that provides a voltage exceeding the threshold Vmax is continued until the error, that is, a difference between the detected voltage Vi of the capacitor 14 concerned and the mean value of the detected voltages of all the capacitors 14, 15, 16 ($\Sigma$Vi (total of detected voltages)/i (number of capacitors)), becomes less than a predetermined value $\Delta$V (S5). In this control, if the temperature drops, the variation V(t) increases, so that the threshold Vmax increases. Thus, unnecessary equalizing operations are considerably avoided.

As described above, the cell voltage detector circuits 5, 6, 7 for detecting the capacitor inter-terminal voltages $V_{14}$, $V_{15}$, $V_{16}$, and the temperature sensor 4 for detecting the temperature t of the capacitors 14, 15, 16, and the switches 8, 9, 10 capable of connecting capacitor terminals are connected. The controller 3 turns on and off the switches 8, 9, 10 and changes the threshold Vmax so as to appropriately control discharge. Thus, the amount of charges stored into the storage battery 17 can be increased.

That is, the cell voltage detector circuits 5, 6, 7 measure the capacitor inter-terminal voltages $V_{14}$, $V_{15}$, $V_{16}$, and the temperature sensor 4 detects the temperature t of the capacitors. On the basis of the detected value, the controller 3 performs discharge by turning on the switches 8, 9, 10, and prohibits discharge by turning off the switches.

The equalizing operation may be controlled directly via temperature, without a threshold being set.

FIG. 3 is a flowchart illustrating an embodiment of the equalizing control performed by the controller 3 functioning as an equalizing circuit.

In an initial state, the equalizing circuit is off (S10). That is, discharge of the capacitor 14 concerned is not performed. If the temperature t is lower than a temperature minimum value (set value) tmin, discharge of the capacitor 14 concerned is not performed (S20). Conversely, if the temperature t rises to or above the temperature minimum value (set value) tmin, the allowable amount of stored charges drops.

In that case, therefore, the equalizing circuit is turned on to start discharging the capacitor 14 concerned (S30). The discharge of the concerned capacitor 14 that provides a voltage exceeding the threshold Vmax is continued until the error, that is, a difference between the detected voltage Vi of the capacitor 14 and the mean value of the detected voltages of all the capacitors 14, 15, 16 ($\Sigma$Vi (total of detected voltages)/i (number of capacitors)), becomes less than a predetermined value $\Delta$V.

That is, the storage battery control apparatus is able to release charges from the capacitors 14, 15, 16 of the storage battery 17 even if the inter-terminal voltages $V_{14}$, $V_{15}$, $V_{16}$ of the capacitors 14, 15, 16 do not reach the predetermined threshold Vmax. That is, if the temperature t of the capacitors 14, 15, 16 is low, the equalizing operation is performed on the basis of discrimination based on the temperature of the capacitors 14, 15, 16, without a threshold Vmax being set.

The foregoing two embodiments may be combined. For example, if the temperature t becomes low, the capacitor internal resistance increases, and the amount of charges stored becomes less than the amount of charges stored at a higher temperature t provided that the voltage is fixed. Therefore, unnecessary discharge can be considerably avoided without a need to set a threshold, and the allowable amount of stored charges can be increased. Conversely, if the temperature rises, the capacitors are protected through the discharge control performed so that the set threshold is not exceeded. Thus, the total amount of charges stored can be increased.

While the invention has been described with reference to what are presently considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the invention.

What is claimed is:

1. A storage battery control apparatus comprising:
   a first controller that releases charges stored in a capacitor that forms a storage battery if an inter-terminal voltage of the capacitor becomes equal to or higher than a predetermined threshold;
   a temperature detector that detects a temperature of the capacitor; and
   a second controller that changes the predetermined threshold in accordance with the temperature of the capacitor.

2. The storage battery control apparatus according to claim 1, wherein the second controller increases the predetermined threshold as the temperature of the capacitor decreases.

3. The storage battery control apparatus according to claim 1, wherein the first controller discharges the capacitor if the inter-terminal voltage of the capacitor reaches the predetermined threshold.

4. The storage battery control apparatus according to claim 1, wherein the first controller does not discharge the capacitor until the inter-terminal voltage of the capacitor reaches the predetermined threshold.

5. The storage battery control apparatus according to claim 1, wherein the storage battery has a plurality of capacitors connected in series, and the first controller performs discharge until amounts of charges stored in all the capacitors become substantially equal.

6. The storage battery control apparatus according to claim 5, wherein if the inter-terminal voltage of any one of the capacitors reaches the predetermined threshold, the first controller releases charges stored in the capacitor whose inter-terminal voltage has reached the predetermined threshold, on a basis of comparison with a value based on the amounts of charges stored in all the capacitors.

7. The storage battery control apparatus according to claim 6, wherein the first controller releases charges from the capacitor whose inter-terminal voltage of the capacitor has reached the predetermined threshold, until the inter-terminal voltage of the capacitor becomes less than a value based on the amounts of charges stored in all the capacitors.

8. The storage battery control apparatus according to claim 1, further comprising:
 a voltage detector that detects the inter-terminal voltage of the capacitor;
 a switch that allows a change of a state of connection between terminals of the capacitor; and
 a control circuit that is connected to the voltage detector, the temperature detector and the switch, and that turns the switch on and off so that discharge of the capacitor is controlled.

9. A storage battery control apparatus comprising:
 a first controller that releases charges stored in a capacitor that forms a storage battery if an inter-terminal voltage of the capacitor becomes equal to or higher than a predetermined threshold;
 a temperature detector that detects a temperature of the capacitor; and
 a second controller that avoids setting the predetermined threshold if the temperature of the capacitor is lower than a predetermined temperature.

10. The storage battery control apparatus according to claim 9, wherein the storage battery has a plurality of capacitors connected in series, and the first controller performs discharge until amounts of charges stored in all the capacitors become substantially equal.

11. The storage battery control apparatus according to claim 10, wherein if the temperature of any one of the capacitors is at least the predetermined temperature, the first controller releases charges stored in the capacitor whose temperature is at least the predetermined temperature, on a basis of comparison with a value based on the amounts of charges stored in all the capacitors.

12. The storage battery control apparatus according to claim 11, wherein the first controller releases charges from the capacitor whose temperature is at least the predetermined temperature, until the inter-terminal voltage of the capacitor becomes less than a value based on the amounts of charges stored in all the capacitors.

13. A control method of a storage battery control apparatus comprising:
 releasing charges stored in a capacitor that forms a storage battery if an inter-terminal voltage of the capacitor becomes equal to or higher than a predetermined threshold;
 detecting a temperature of the capacitor; and
 changing the predetermined threshold in accordance with the temperature of the capacitor.

14. A control method of a storage battery control apparatus comprising:
 releasing charges stored in a capacitor that forms a storage battery if an inter-terminal voltage of the capacitor becomes equal to or higher than a predetermined threshold;
 detecting a temperature of the capacitor; and
 avoiding setting the predetermined threshold if the temperature of the capacitor is lower than a temperature.

* * * * *